May 11, 1926.

E. C. FULLER

RADIUS ROD SAFETY LOCK

Filed Jan. 10, 1925

1,584,526

Inventor
E. C. Fuller.
By *[signature]*
Attorney

Patented May 11, 1926.

1,584,526

UNITED STATES PATENT OFFICE.

EARL C. FULLER, OF NEWHILL, NORTH CAROLINA, ASSIGNOR TO LEAKE-FULLER SALES COMPANY, A COPARTNERSHIP COMPOSED OF JAMES P. LEAKE, OF RALEIGH, NORTH CAROLINA, EARL C. FULLER, OF NEWHILL, NORTH CAROLINA, JOHN Q. SEAWELL, OF SILVER CITY, NORTH CAROLINA, AND WELDON E. HAWKINS, OF RALEIGH, NORTH CAROLINA.

RADIUS-ROD SAFETY LOCK.

Application filed January 10, 1925. Serial No. 1,671.

My said invention relates to radius rod safety locks designed for attachment on the underside of the radius rod where the same is connected to the spring perch extending through the front axle of an automobile preferably of the Ford type.

It is an object of the invention to provide a device of the simplest and cheapest construction which will prevent rattling, which will prevent the working loose of the nut which holds the radius rod in position and which will prevent vibration or shimmying of the radius rod and the working of the front wheels against the spring perch no matter how much the parts are worn.

Another object of the invention is to provide a device which will tend to prevent the radius rod from dropping down in case the threads become worn and the nut works off.

Figure 1:
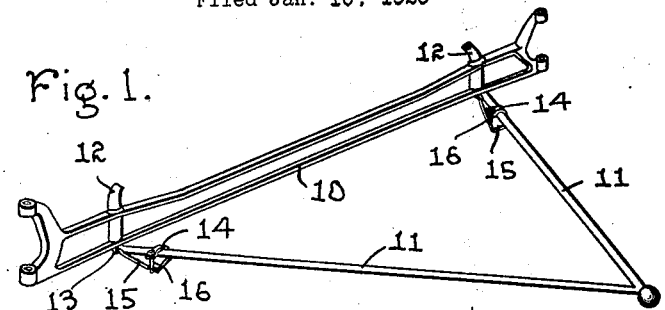
Figure 2:
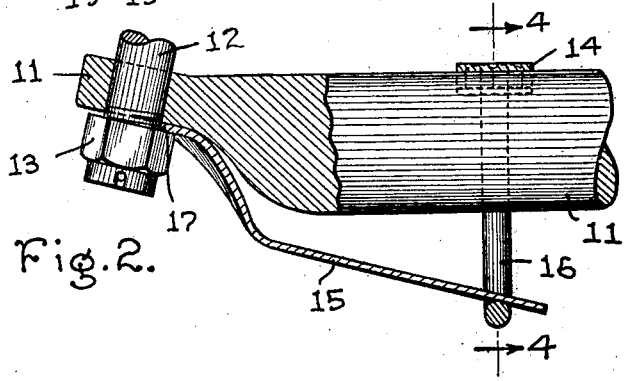
Figure 3:
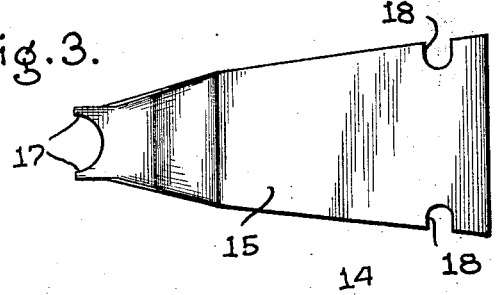
Figure 4:
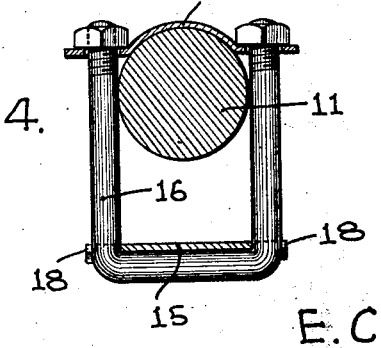

Referring to the accompanying drawings which are made a part hereof and on which similar reference characters indicate similar parts, Figure 1 is a perspective of the front axle of an automobile illustrating the application of my invention, Figure 2 is a side elevation partly in section of the front axle and radius rod connection illustrating the application of my invention, Figure 3 is a bottom plan view of my invention, and Figure 4 is a section on the line 4—4 of Figure 2.

In the drawings reference character 10 indicates an apertured member such as the front axle of an automobile having a rod-like element or spring perch 12 extending therethrough and through the extremity of one end of an apertured bar or radius rod 11 and secured thereto by means of a castellated nut 13 on the underside of the radius rod. A body 15 comprising my safety lock and anti-rattling device is fastened on the underside of the radius rod, said body, as shown in Fig. 3, is substantially wedge-shaped and is provided with a dished or cupped portion at its smaller end to provide a recess for a nut which is adapted to seat on the flattened extremity. The cupped portion is offset from the body and is of a shape to fit snugly about the polygonal faces of the nut and engage the corners when the nut is rotated thus resisting any turning of the nut on the spring perch and preventing accidental unscrewing and loss thereof.

The smaller end 17 of the body is for engagement with the threaded end of the spring perch between the radius rod and the nut. The widened rear end portion is provided with cut out portions 18 for reception of a U-bolt 16 adapted to be clamped about the radius rod and body 15 by a clamp 14 extending across the upper end thereof.

The body 15 is preferably composed of spring metal and when clamped in the position of Figure 1 it is under a stress which tends to force the offset end longitudinally or endwise, such tendency being prevented by the engagement of said end with the threaded portion of the spring perch 12.

In operation when my device is applied the convex side of the cupped portion is fulcrumed against the radius rod and the stress occasioned by tightening the U-clamp 16 will tend to force the concaved extremity 17 longitudinally of the radius rod and press the spring perch against the side of the opening in the radius rod thus frictionally binding the rod to the perch. Also the engagement of the concaved end with the threads on the spring perch will aid in maintaining the parts in position, however, the radius rod will be tightly clamped if the threads are omitted.

It will be readily understood from the foregoing that the body of my device may be stamped at a single operation from a single blank of spring metal and that the same may be readily and quickly fastened in operative position. The device further will prevent the accidental unscrewing and loss of the nut and should threads on the spring perch become worn and the nut lost the radius rod will be prevented from falling down and the danger of driving due to such defects will be practically eliminated.

It will also be understood that rattling of the parts forming the joint will be eliminated and lost motion will be taken up.

It will be obvious to those skilled in the art that minor variations may be made in the device without departing from the spirit of the invention and therefore I do not limit myself to what is shown in the drawings and described in the specification, but only as indicated in the appended claims.

Having thus fully described my said invention what I claim is:

1. An attachment for radius rods comprising a body having a recess in each side adjacent its rear end for the reception of a fastening element and having its forward end inclined and provided with an offset flattened portion having an arcuate extremity for engagement with the threaded portion of the spring perch, substantially as set forth.

2. An attachment for automobiles comprising a body having one end bent at an angle to the plane of said body and having its extremity in substantially a plane parallel to the plane of said body and provided with an arcuate portion the opposite end of said body having oppositely disposed slots for engagement with a U-bolt for fastening the device in position, substantially as set forth.

3. The combination of an apertured member, a rod like element extending through said apertured member, an apertured bar on the under side of said apertured element and having an aperture in alinement with the apertures of said member and means for securing the parts together said means comprising a tapered spring element having a slotted rear portion adapted to be secured to said bar and having an inclined forward portion with an offset portion extending therefrom in the plane parallel to the body of said tapered spring element and adapted to bear against said rod-like element, substantially as set forth.

4. In combination a radius rod, a spring perch received in said radius rod, a spring member having its outer end fastened to said radius rod and the inner end contacting the spring perch, the intermediate portion of said spring member bearing against the radius rod whereby the inner end of the spring member is under stress tending to move the same longitudinally, and binding the radius rod and spring perch together, substantially as set forth.

5. A radius rod safety lock, comprising a body of resilient material having end portions adapted respectively for cooperation with a fastening element and with an element extending into an aperture in the radius rod said body being adapted to be fulcrumed against a portion of the radius rod to cause the body of resilient material to bind the parts laterally together said spring member being provided with a nut receiving recess adapted to resist rotation of a nut, substantially as set forth.

6. An attachment for radius rods comprising a body having one end shaped to fit against a rod-like member and being bent at an angle therefrom, means for securing said body to the radius rod the bent portion of the same being fulcrumed against said rod and binding said rod-like member against the side of the receiving opening in the radius rod whereby the radius rod and rod-like body will be maintained in assembled relation, substantially as set forth.

7. The combination with an axle having a spring perch carried thereby and a radius rod with an opening receiving said spring perch, of a device for locking the parts in assembled relation comprising a body of spring metal having a curved portion shaped to bear against said radius rod and press the spring perch against the side of its receiving opening, substantially as set forth.

In witness whereof, I have hereunto set my hand and seal at Newhill, North Carolina this 18th day of December, A. D. nineteen hundred and twenty-four.

EARL C. FULLER. [L. S.]